United States Patent [19]

Horihata

[11] Patent Number: 5,617,265

[45] Date of Patent: Apr. 1, 1997

[54] MAGNETIC TAPE RECORDING DEVICE COMPRISING A VARIABLE DATA REGION LENGTH SYSTEM

[75] Inventor: Katsushi Horihata, Kobe, Japan

[73] Assignee: Mita Industrial Co., Ltd., Osaka, Japan

[21] Appl. No.: 201,140

[22] Filed: Feb. 24, 1994

Related U.S. Application Data

[62] Division of Ser. No. 945,085, Sep. 15, 1992, abandoned.

[30] Foreign Application Priority Data

Sep. 20, 1991 [JP] Japan ................................ 3-241226

[51] Int. Cl.$^6$ .............................................. G11B 15/087
[52] U.S. Cl. ........................................ 360/69; 360/72.1
[58] Field of Search .............................. 260/72.1, 72.2, 260/48

[56] References Cited

U.S. PATENT DOCUMENTS

| | | | |
|---|---|---|---|
| 2,907,002 | 9/1959 | Smith et al. | 360/48 X |
| 4,932,014 | 6/1990 | Tamiya | 360/55 X |
| 5,079,724 | 1/1992 | Shiraki et al. | 395/146 |
| 5,097,261 | 3/1992 | Langdon, Jr. et al. | 341/51 |
| 5,200,864 | 4/1993 | Dunn et al. | 360/48 |
| 5,237,681 | 8/1993 | Kagan et al. | 395/600 |
| 5,274,772 | 12/1993 | Dunn et al. | 360/48 X |
| 5,335,328 | 8/1994 | Dunn et al. | 360/48 X |

*Primary Examiner*—W. R. Young
*Assistant Examiner*—James L. Habermehl
*Attorney, Agent, or Firm*—Jordan and Hamburg

[57] ABSTRACT

A magnetic tape recording device includes a region setting device for setting on a magnetic tape a plurality of data regions in which data are recorded, a data recording device for recording data in the data regions, a section identifier recording device for recording a section identifier representative of the head of each data region, and a control unit for controlling the section identifier recording device so as to record a section identifier representative of the head of a second data region immediately after a data is recorded in a first data region in response to the region setting device. With this recording device, the magnetic tape is not required to be formatted so as to attain data regions in advance recording the data. This leads to an improved operability of the recording device in recording the data on the magnetic tape.

2 Claims, 16 Drawing Sheets

| P. No. | 1 | 2 | 3 | 4 | 5 | 6 | 7 | 8 | 9 | 10 | --- |
|---|---|---|---|---|---|---|---|---|---|---|---|
| FILE No. | -- | F2 | F3 | F3 | F3 | -- | F4 | F5 | -- | -- | |
| PAGE No. | -- | 1 | 1 | 2 | 3 | -- | 1 | 1 | -- | -- | |
| UNUSED FLAG | -- | -- | -- | -- | -- | -- | -- | -- | 1 | 1 | |
| ERASE FLAG | -- | -- | -- | -- | -- | 1 | -- | -- | -- | -- | |
| UNUSABLE FLAG | 1 | -- | -- | -- | -- | -- | -- | -- | -- | -- | |
| IMAGE DATA SIZE | -- | A3 | A4 | A4 | A4 | A3 | B4 | A4 | -- | -- | |

| P. No. | 1 | 2 | 3 | 4 | 5 | 6 | 7 | 8 | 9 | 10 | --- |
|---|---|---|---|---|---|---|---|---|---|---|---|
| FILE No. | -- | F2 | F3 | F3 | F3 | -- | F4 | F5 | -- | -- | |
| PAGE No. | -- | 1 | 1 | 2 | 3 | -- | 1 | 1 | -- | -- | |
| UNUSED FLAG | -- | -- | -- | -- | -- | -- | -- | -- | 1 | 1 | |
| ERASE FLAG | -- | -- | -- | -- | -- | 1 | -- | -- | -- | -- | |
| UNUSABLE FLAG | 1 | -- | -- | -- | -- | -- | -- | -- | -- | -- | |
| IMAGE DATA SIZE | -- | A3 | A4 | A4 | A4 | -- | B4 | A4 | -- | -- | |
| FORMAT SIZE DATA | A3 | A3 | A3 | A3 | A3 | A3 | A3 | A3 | -- | -- | |

FIG. 17

| P. No. | 1 | 2 | 3 | 4 | 5 | 6 | 7 | 8 | 9 | 10 | 11 | 12 | 13 | 14 | 15 | 16 | ... |
|---|---|---|---|---|---|---|---|---|---|---|---|---|---|---|---|---|---|
| FILE No. | -- | F1 | -- | F1 | -- | -- | -- | F3 | -- | -- | -- | F4 | F4 | F4 | -- | -- | ... |
| PAGE No. | -- | 1 | 1 | 2 | 1 | -- | -- | 1 | -- | -- | -- | 1 | 2 | 3 | -- | -- | ... |
| CONTINUATION FLAG | -- | -- | -- | -- | -- | -- | -- | -- | -- | -- | 1 | -- | -- | -- | -- | -- | ... |
| UNUSED FLAG | -- | -- | -- | -- | -- | 1 | 1 | -- | 1 | 1 | -- | -- | -- | -- | 1 | 1 | ... |
| ERASE FLAG | -- | -- | -- | -- | -- | -- | -- | -- | -- | -- | -- | -- | -- | -- | -- | -- | ... |
| UNUSABLE FLAG | 1 | -- | -- | -- | -- | -- | -- | -- | -- | -- | -- | -- | -- | -- | -- | -- | ... |
| IMAGE DATA SIZE | -- | A4 | -- | A4 | -- | -- | -- | A3 | -- | -- | -- | A5 | A5 | A5 | -- | -- | ... |
| REFERENCE SIZE | A5 | A5 | A5 | A5 | A5 | A5 | A5 | A5 | A5 | A5 | A5 | A5 | A5 | A5 | A5 | A5 | ... | ns # MAGNETIC TAPE RECORDING DEVICE COMPRISING A VARIABLE DATA REGION LENGTH SYSTEM

This application is a division of application Ser. No. 07/945,085 filed Sep. 15, 1992 now abandoned.

BACKGROUND OF THE INVENTION AND RELATED ART STATEMENT

This invention relates to an electronic filing device for storing an image data and a facsimile data and, particularly to a magnetic tape recording device employing a digital audio tape (hereinafter referred to as a DAT) as a storage medium.

In these years, there have been widely used optical disks employing a laser, photoelectromagnetic disks, magnetic disks such as a fixed disk and a floppy disk, and magnetic tapes, etc. in computers or like electronic filing devices. Particularly recently, there has been proposed a magnetic tape recording device including a digital audio tape recorder (DAT recorder) of the rotary head type as an exchangeable and large capacity storage medium as in Unexamined Japanese Patent Publication No. 1-290148.

The above publication teaches a concept of recording data other than acoustic data using a magnetic tape recording device designed to record the acoustic data. In this device, an image information is recorded on a DAT in accordance with a format standard (EIAJ CP-2305) for recording the acoustic data. Further, when the image information is recorded using this device, the DAT should be formatted in advance so as to attain a record region similar to the magnetic disk. This device is incapable of recording the image information on a raw tape while formatting the same. Due to an azimuth angle defined between the magnetic head and the DAT, the DAT is formatted in advance at the same speed as the data is recorded on the DAT. For instance, in the case of a 120 minutes DAT, it takes 120 minutes to format the DAT. Accordingly, this device requires a long time to format the DAT when a new tape is used, thereby exceedingly reducing the operability thereof.

A leading end portion of the tape is often uncovered by a cartridge and is exposed to the air, which may cause deterioration in the quality of contents recorded on the tape. In view of this, according to the above format standard, a region having a specified size following a leading end of the DAT (hereinafter referred to as a read-in region) is set as an empty region, and thereby the acoustic data is recordable on the DAT after the read-in region.

Accordingly, when the image information is recorded, the image information is sequentially recorded together with the administrative information thereof. In the case of carrying out the filing of the image information, such as recording of a new image information and correction of the already recorded image information, the administrative information is read from the loaded DAT and the image information is filed based on this administrative information. Further, discrimination is made whether the loaded DAT is a new one or a used one based on the presence or absence of the administrative information. This is because the administrative information is not recorded on the loaded DAT when the loaded DAT is a new one.

The above discrimination is made based on the presence or absence of the administrative information recorded after the read-in region. Thus, when the new DAT is loaded, it takes time (at least 17 seconds) to make the above discrimination because the empty read-in region has to be scanned to read the administrative information. Further, when it is discriminated that the new DAT is loaded, the DAT should be formatted in accordance with a specified format so as to record an initial administrative information and to set a record region. Therefore, the above recording device suffers the inconvenience that the filing operation cannot be started smoothly in a short time.

SUMMARY OF THE INVENTION

It is an object of the invention to overcome the problems of the prior art and to provide a magnetic tape recording device capable of discriminating whether a loaded DAT is new or used, and of using a new DAT without formatting the same in advance, thereby enhancing filing operability thereof.

Accordingly, the invention is directed to a magnetic tape recording device comprising region setting means for setting on a magnetic tape a plurality of data regions in which data are recorded; data recording means for recording data in the data regions; section identifier recording means for recording a section identifier representative of the head of each data region; and control means for controlling the section identifier recording means so as to record a section identifier representative of the head of a second data region immediately after a data is recorded in a first data region in response to the region setting means.

The size of each data region may be set so as to correspond with that of the data to be recorded therein.

The data recording means is adapted for recording a plurality of different sized data in the data regions, and the size of the data regions may be set so as to correspond with that of the largest data among the plurality of data.

The length of the data region may be set at a predetermined record region unit length.

The region setting means may include detector means for detecting the size of the data to be recorded; calculator means for calculating the number of data regions required to record the data based on the detection result of the detector means and the record region unit length; and region forming means for forming an extended data region defined by the following equation based on the calculated number of data regions: $Ad:=N \times Au + (N-1) \times Af$ where Ad denotes the size of the extended data region, Au denotes the record region unit length, Af denotes the length of a region in which the section identifier is recorded, and N denotes the number of data regions.

Further, the invention may be directed to a magnetic tape recording device comprising a head for writing and reading data in and from a magnetic tape; drive means for causing the head to move relative to the magnetic tape; discriminator means for scanning a read-in region provided at the head of the magnetic tape and for discriminating whether there is recorded in the read-in region a tape identifier which is representative of whether the magnetic tape is a new one or a used one; identifier generator means for generating the tape identifier; and identifier recording means for rewinding the magnetic tape when the tape identifier is not recorded in the read-in region and for recording the tape identifier generated in the identifier generator means in the read-in region.

The above magnetic tape recording device may further comprise administrative data generator means for generating an initial administrative data concerning the magnetic tape; and administrative data recording means for recording the administrative data generated in the administrative data generator means after the recording of the tape identifier is completed when the tape identifier is not recorded in the read-in region.

In the magnetic tape recording device according to the invention, in recording the data, immediately after the data region is set and the data is recorded in the set data region, the section identifier representative of the next data region is recorded. Accordingly, there can be obviated the need for formatting the magnetic tape in advance so as to attain the data regions in recording the data. This enables the new data to be recorded on the magnetic tape rapidly.

Also, since the size of the data region the same as that of the data to be recorded, no empty area is left in the respective data regions formed on the magnetic tape. This allows an efficient use of the magnetic tape.

Further, since the size of the data regions is set at that of the largest data among the plurality of those to be recorded, each of the plurality of data is recorded in one data region without fail, thereby facilitating administration and renewal of the data.

Moreover, since the length of the data regions is set at the predetermined record region unit length, the number of the data regions formed on the magnetic tape is fixed regardless of editing and renewal of the data, thereby facilitating administration and renewal of the data.

Furthermore, the number of the data regions, whose length is set at the record region unit length, required to record the data is calculated, and the extended data region of the size of [(N×record region unit length)+(N−1)×(length of the region in which the section identifier is recorded)]. Accordingly, in editing and renewing the data, the extended data regions may be divided into a plurality of data regions whose length is set at the record region unit length. This allows an efficient use of the data regions.

Also, when the magnetic tape is loaded, it is discriminated whether the predetermined tape identifier is recorded in the read-in region provided at the head of the magnetic tape. If the tape identifier is not recorded, the magnetic tape is rewound and the tape identifier is recorded in the read-in region. With this arrangement, discrimination can be made rapidly on whether the loaded tape is a new one or a used one.

In addition, the initial administrative data concerning the loaded magnetic tape is recorded when it is discriminated that the tape identifier is not recorded. Accordingly, even in the case where a new magnetic tape is loaded, the magnetic tape recording device according to the invention is allowed to proceed to the filing operation smoothly in a short time following discrimination of the tape identifier, thereby enhancing the filing operability thereof.

BRIEF DESCRIPTION OF THE DRAWINGS

FIG. 17 is a chart showing an example of TOC data concerning an image data which are recorded on the TOC region in the fourth embodiment;

DETAILED DESCRIPTION OF PREFERRED EMBODIMENTS OF THE INVENTION

Figure 1:
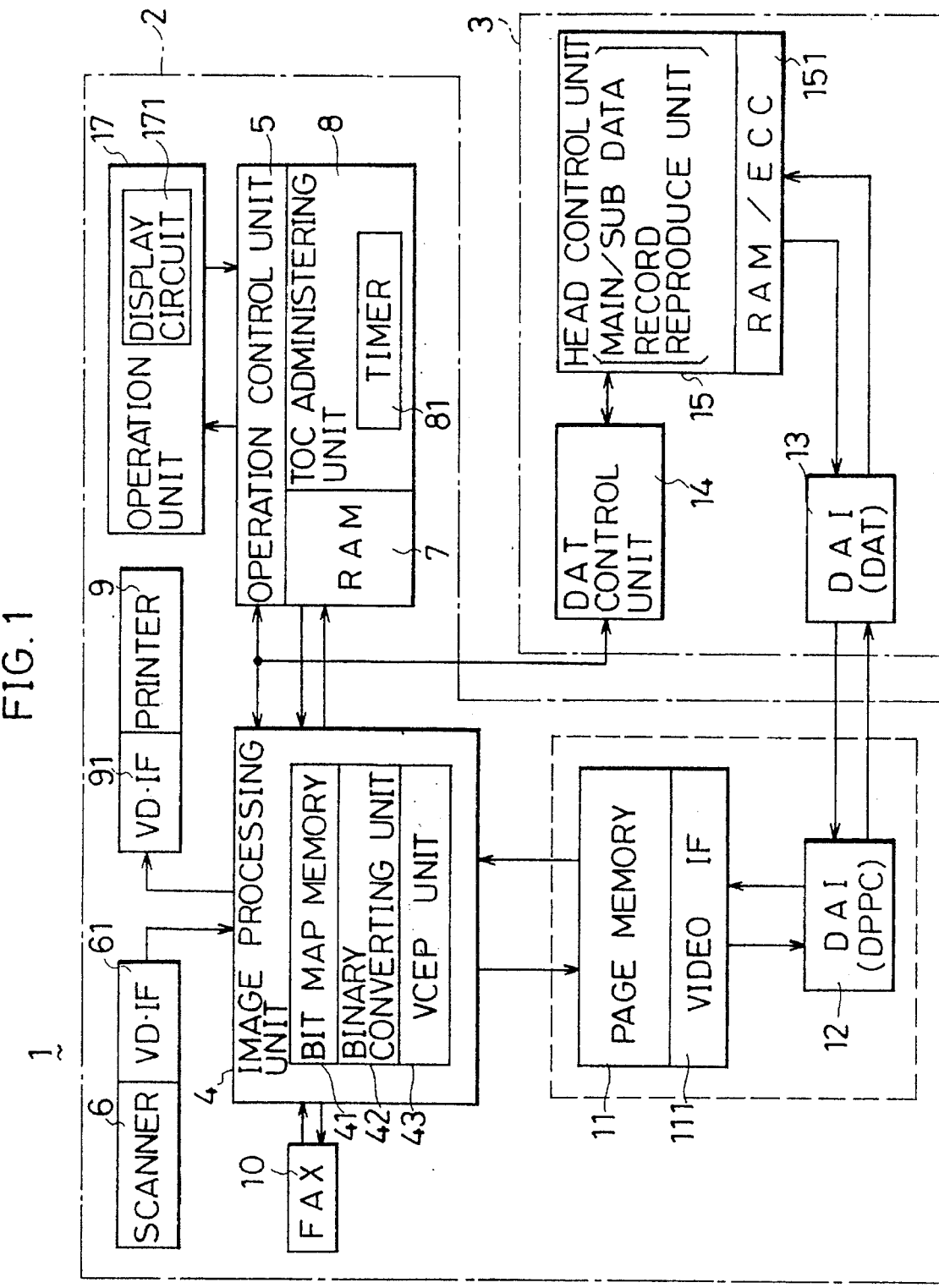
FIG. 1 is a block diagram showing an overall construction of a magnetic tape recording device as a first embodiment of the invention.
Figure 2:
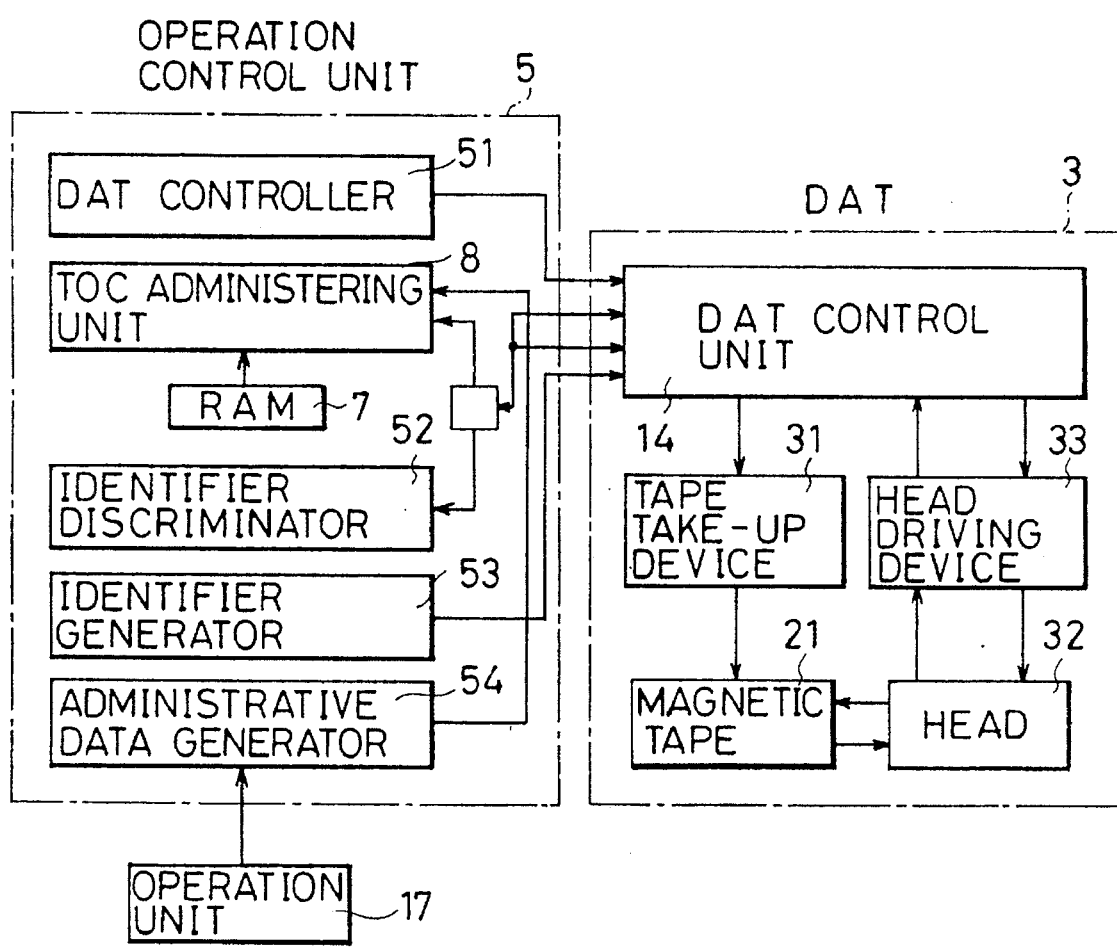
FIG. 2 is a construction diagram showing an operation control unit and a DAT unit.

FIG. 1 is a block diagram showing an overall construction of a magnetic tape recording device 1 in accordance with the invention, and FIG. 2 is a diagram showing detailed constructions of an operation control unit 5 and a DAT 3.

The magnetic tape recording device 1 consists essentially of a data control unit 2 capable of functioning as a digital plain paper copier (DPPC), and a digital audio tape recorder (DAT recorder) 3.

The data control unit 2 is mainly provided with an image processing unit 4, an operation control unit 5, a scanner 6 for reading a document image or like image, and a printer 9 for copying an image data on a sheet, a facsimile machine (FAX) 10, a page memory 11, etc. The scanner 6 and the printer 9 are connected to the image processing unit 4 through video interfaces (VD.IF) 61, 91 respectively. The data control unit 2 is connected to the DAT recorder 3 through a digital audio interface (DAI) 12. Further, the page memory 11 is connected to the DAI 12 through a VD.IF 111.

The image processing unit 4 includes a microcomputer, and is internally provided with a bit map memory 41, a binary converting unit 42, and a video image signal compression/expansion processing unit (VCEPU) 43. The bit map memory 41 temporarily stores data read from the scanner 6 and the FAX 10, or data output from the page memory 11 as a bit information. The binary converting unit 42 converts the data stored in the bit map memory 41 into binary form. The unit 43 compresses the data output from the bit map memory 41 and outputs the compressed data to the page memory 11, etc. The unit 43 also expands the data output from the page memory 11 and outputs the expanded data to the bit map memory 41. The data from the scanner 6, the FAX 10, and the page memory 11 may be transferred directly to specified circuits without passing through the unit 43 if necessary.

The image processing unit 4 adds an E0D (end of data) signal to an end of the data read by the scanner 6 or received by the FAX 10 according to operation of a mode changeover key provided at an operation unit 17 to be described later. The E0D signal is representative of the end of the data. The processing unit 4 further outputs the data added with the E0D signal through the page memory 11 and the like to the DAT recorder 3, in which the data is recorded on a magnetic tape.

Further, the image processing unit 4 outputs the data read by the scanner 6, the data received by the FAX 10, or the data read from the DAT recorder 3 to the printer 9. These data are hereinafter referred to as image data. The image processing unit 4 also outputs the image data read by the scanner 6, the image data read from the DAT recorder 3, or like image data to the FAX 10.

The page memory 11 stores the image data from the image processing unit 4 or the DAT recorder 3 by the page.

The operation control unit 5 includes a microcomputer, and is adapted for controlling an operation of each component of the magnetic tape recording device according to operation of the operation unit 17. The operation control unit 5 is provided with a random access memory (RAM) for storing TOC (table of contents) data indicative of attributes of the data recorded on the magnetic tape such as a registration date and a title, and a TOC administering unit 8 for administering the TOC data. Thus, the operation control unit 5 also administers the TOC data recorded on the magnetic tape. More specifically, the TOC administering unit 8 reads the TOC data from the magnetic tape when the magnetic tape is set and causes the RAM 7 to store the read TOC data. The unit 8 also renews the TOC data stored in the RAM 7, for example, according to an instruction given from the operation unit 17 to record the image data on the magnetic tape or to erase the recorded image data. The unit 8 is internally provided with a timer 81 used to administer the TOC data. It will be noted that the TOC data will be described in detail later.

The operation control unit 5 is further internally provided with a DAT controller 51, an identifier discriminator 52, an identifier generator 53, and an administrative data generator 54 in addition to the RAM 7 and the TOC administering unit 8. The DAT controller 51 generally controls driving of the DAT recorder 3 in association with operations of writing and reading the data in and from the magnetic tape. The identifier discriminator 52 discriminates whether an identifier recorded in a read-in region (to be described later) of a magnetic tape 21 is a predetermined tape identifier. The tape identifier is, as will be described later, used to discriminate whether the loaded magnetic tape is an unused one, i.e. a new one, or a used one which has been loaded on the DAT recorder 3 at least once.

The identifier generator 53 generates a specified identification code so as to record the tape identifier on the magnetic tape 21 when the magnetic tape 21 is determined to be a new one. The administrative data generator 54 generates initial TOC data in respective regions of the magnetic tape 21 such as a tape attribute region, a conversion table region, a file attribute region, a data operation history, etc. The functions of the DAT controller 51, the identifier discriminator 52, the identifier generator 53, and the administrative data generator 54 are implemented by the microcomputer constituting the operation control unit 5.

The operation control unit 5 also causes the TOC data stored in the RAM 7 to be recorded on the magnetic tape 21 when the specified operation is completed or upon each lapse of a specified period by the use of the timer 81.

The operation unit 17 is provided with various keys, and a display circuit 171 which allows confirmation of the operated contents. The various keys includes a TOC input key which is manipulated to input the TOC data used to administer the data recorded on the magnetic tape 21, a mode changeover key which is manipulated to change a file mode to a FAX mode, and vice versa, a setting key which is manipulated to set an image density when the document image is read by the scanner 6 and to set the number of copies to be made when the image is printed on the sheet, and a key which is manipulated to retrieve the data recorded on the magnetic tape 21. In the file mode, the data read by the scanner 6 is recorded on the magnetic mode. In the FAX mode, the data received by the FAX 10 is recorded on the magnetic tape 21.

Upon receipt of an instruction of carrying out a retrieving operation from the operation unit 17, the operation control unit 5 causes the display circuit 171 in the operation unit 17 to display retrieval data such as file numbers while accessing the TOC data stored in the RAM 7 through the TOC administering unit 8.

The DAT recorder 3 is provided with a DAT control unit 14, a head control unit 15, etc. The head control unit 15 is connected to the data control unit 2 through a DAI 13. The DAT control unit 14 controls operations of respective components of the DAT recorder 3, and causes the head control unit 15 to record, reproduce, and erase the image data upon receipt of a control command from the operation control unit 5.

The head control unit 15 is provided with a random access memory/error correction code (RAM/ECC) unit 151, a tape take-up device 31 for taking up the magnetic tape 21, a head 32, and a head driving device 33 for driving the head 32 as shown in FIGS. 1 and 2. The head 32 writes and reads the TOC data, the image data, and other data in and from the magnetic tape 21. The RAM/ECC unit 151 is adapted for adding an error correction code to the data input from the data control unit 2 when the data is recorded, and corrects an error in the data read from the magnetic tape 21, if any, based on the error correction code when the data is reproduced. The head control unit 15 controls the driving of the tape take-up device 31 and the head driving device 33 in accordance with an instruction from the DAT control unit 14.

Figure 3:
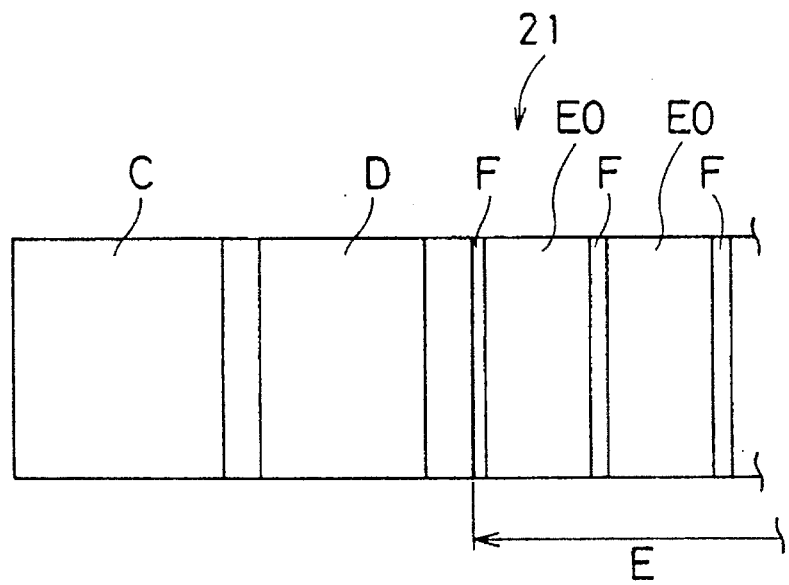
FIG. 3 is a schematic diagram showing contents of data recorded on a magnetic tape.
Figure 4:
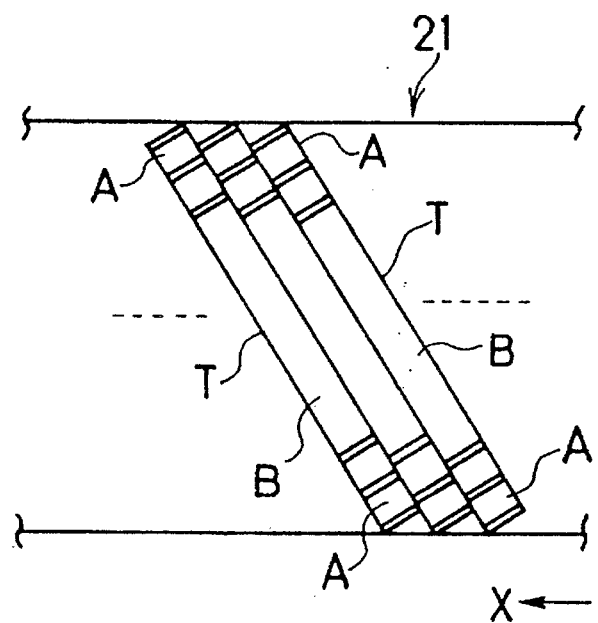
FIG. 4 is a diagram showing a format of tracks formed on the magnetic tape.

There will be described contents of data recorded on the magnetic tape 21. FIG. 3 is a schematic diagram showing contents of data recorded on the magnetic tape 21, and FIG. 4 is a diagram showing a format of tracks formed on the magnetic tape 21.

On the magnetic tape 21, there are formed a read-in region C, a TOC region D, and a data region group E from a leading end thereof. The data region group E consists of a plurality of data regions E0 and section identification regions F formed at the head of the respective data regions E0. It should be understood that a data region and a corresponding section identification region constitute one data section. The above regions consist of a plurality of tracks T formed on the magnetic tape 21 and slanting at a specified angle with respect to a direction X of feed of the magnetic tape 21. The respective tracks T are formatted in a specified manner in accordance with the EIAJ CP-2305 standard shown in TABLE-1 below.

TABLE 1

| AREA | CONTENTS | # OF BLOCKS |
|---|---|---|
| Margin Area | MARGIN 1 | 11 |
| Sub-Area 1 | PRE AMBLE 1 | 2 |
| | SUB-DATA 1 | 8 |
| | POST AMPLE 1 | 1 |
| ATF Area 1 | IBG 1 | 3 |
| | ATF 1 | 5 |
| | IBG 2 | 3 |
| Main Area | PRE AMBLE 2 | 2 |
| | MAIN-DATA | 128 |
| ATF Area 2 | IBG 3 | 3 |
| | ATF 2 | 5 |
| | IBG 4 | 3 |
| Sub-Area 2 | PRE AMBLE 3 | 2 |
| | SUB-DATA 2 | 8 |
| | POST AMPLE 2 | 1 |
| Margin Area | MARGIN 2 | 11 |
| TOTAL | | 196 |

In each track T, a main area B is formed at a center, and a sub-area A is formed at each of opposite ends of the main area B. In the sub-area A are recorded a program number data (P. No.) indicative of a data recording order, an index data used to discriminate the region, and the like. In the main area B are recorded the TOC data, and the image data, and the like.

The read-in region C is used not to record the image data, but to record a tape identifier for discriminating whether the magnetic tape 21 is a new one or a used one. The tape identifier includes a code other than a record code used as an image data, and consists of, for example, a three digit hexadecimal code. The magnetic tape 21 is discriminated to be a used one if the tape identifier is recorded in the read-in region C while being discriminated to be a new one if no tape identifier is recorded therein. A recording time (length) of the magnetic tape 21 is detected by taking up the read-in region C.

Figure 5:
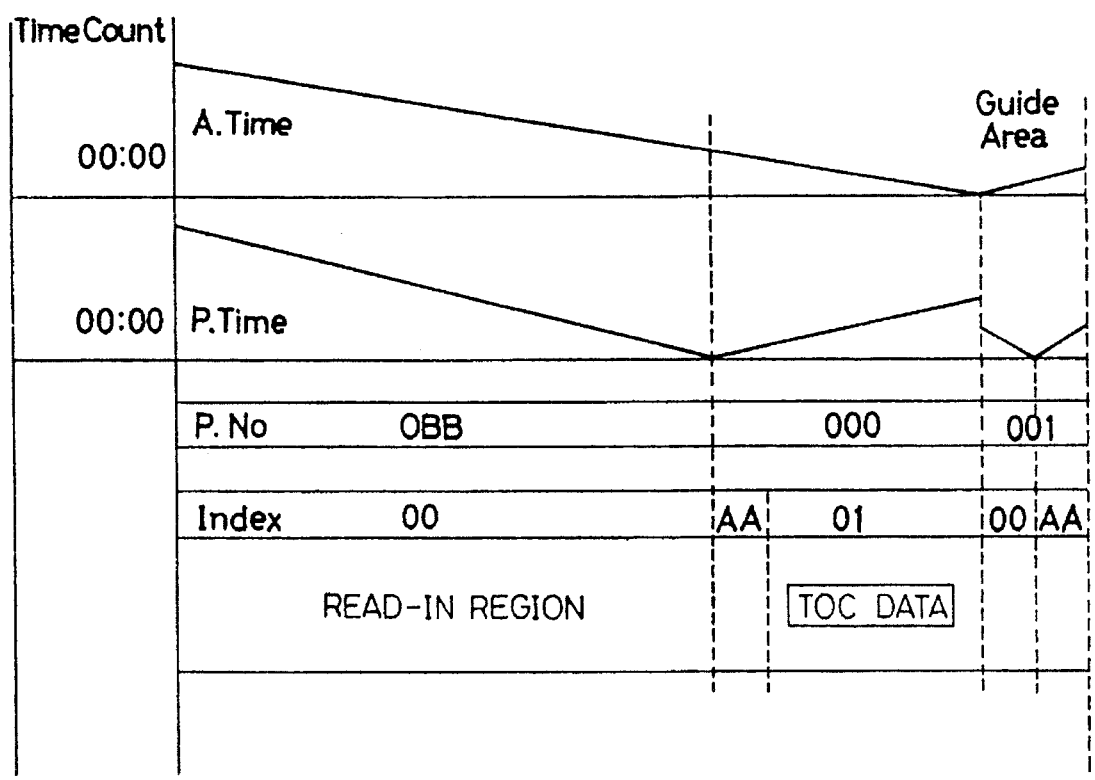
FIG. 5 is a diagram showing contents of data recorded in a read-in region and a TOC region of the magnetic tape.

FIG. 5 is a diagram showing contents of data recorded in the read-in region C and the TOC region D of the magnetic tape 21.

As shown in this figure, a program number data "0BB" (hexadecimal code) and an index data "00" are recorded in the sub-areas A of the respective tracks T in the read-in region C. The program number data "0BB" serves as a tape identifier. It will be appreciated that the tape identifier may be any code which is not used as a record code for the image data, and is not limited to the hexadecimal code "0BB."

As shown in TABLE-2 below, in the TOC region D are recorded TOC data. The TOC data includes a tape attribute data such as a name of the tape, an administrative data representative of empty regions in the data region group E such as unused pages and pages having the data erased, a registration time, a registrant, a title, a file attribute data such as a password, and a tape operation history data such as a load number and an error number. The load number and the error number are respectively indicative of how many times the TOC data have been renewed and of how many errors the magnetic tape 21 has had.

TABLE 2

| DATA | CONTENTS |
|---|---|
| Tape attribute data | Name of tape |
| | Date on which the tape is first used |
| | Tape length (min.) |
| Administrative data | Unused page |
| | Data erased page |
| | Used page (availability information) |
| | Unusable page (due to deterioration, etc.) |
| File attribute data | Registration date (year, month, date, hour, minute, second) |
| | Renewal date (year, month, date, hour, minute, second) |
| | Name of Registrant |
| | Title |
| | Password |
| | Size of sheet (encoded A4, B4, A3 size data, etc.) |
| Tape operation | Load number (number of rewritings of TOC data) |
| history data | Error number |

As shown in FIG. 5, a program number data "000" and index data "AA", "01" are recorded in the sub-areas A of the respective tracks T in the TOC region D. The index data "AA" is recorded on the tracks from the first one up to the one of a specified number, and the index data "01" is recorded on the subsequent tracks. The TOC data is recorded in the main areas B of the respective tracks T in the TOC region D.

The length of the read-in region C and that of the TOC region D are controlled by measuring recording times (indicated at A.Time, P.Time in FIG. 5).

In the data region group E are recorded the image data, and like data. The image data are sequentially recorded in the data region group E, thereby defining the respective data regions E0 in the data region group E. The data region E0 is so formed as to have a fixed record region unit length or an arbitrary record region length. To form the data region E0 so as to have an arbitrary record region length means that the data region E0 is formed as a region occupied by one image data recorded therein. Since the width of the data or record regions is predetermined to that of the magnetic tape 21, the size of the region will be described in terms of the length thereof hereafter.

On the other hand, to form the data region E0 so as to have a fixed record region unit length means that each data region E0 is formed as a unit region occupied by a reference image data of a particular size obtained, for example, when an image formed on a document of a specified standard size is read by the scanner 6. In this case, when the image data larger than the reference image data is recorded, a plurality of data regions E0 are formed while this image data is being recorded.

For example, in the case where each data region E0 is formed so as to record an A3 size image data therein, and a data file including a plurality of A3 sized image data is recorded, the file is recorded over a plurality of data regions E0. When the data region group E is completely available, the image data of the aforementioned file are recorded continuously. However, when all the data regions E0 of the data region group E are used, and the file is renewably recorded, the image data of the file may be recorded in separate data regions E0. Information (program number data, page number, etc) concerning the data regions E0 in which the respective image data of the file are recorded is recorded in the TOC region D, and is administered by the TOC administering unit 8.

In the section identification region F is recorded a section identifier which is used to identify the data region E0. By presence of the section identifier, the respective data regions E0 are identified and the head is set at the leading end of the data region E0 when the data is retrieved.

Figure 6:
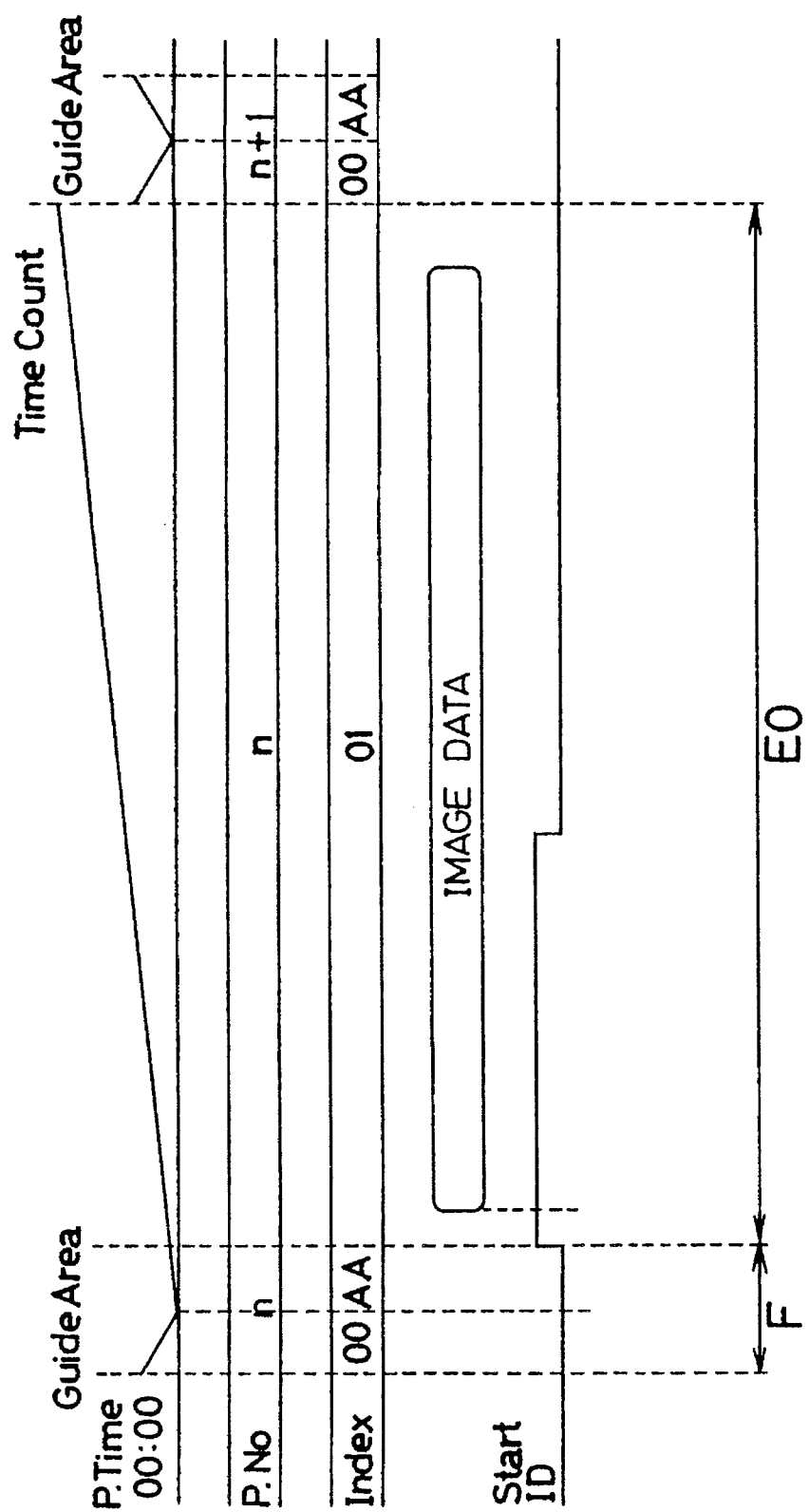
FIG. 6 is a diagram showing contents of data recorded in a data region and a section identification area of the magnetic tape.

FIG. 6 is a diagram showing contents of data recorded in the data region E0 and the section identification region F of the magnetic tape 21.

As shown in this figure, the program number data and the index data "01" or "00" are recorded in the sub-areas A of the tracks T in each data region E0. The program number data is incremented by one as the data region moves away from the leading end of the magnetic head 21. In the main areas B of the tracks T of the respective data regions E0 are recorded the image data, and the like.

In the sub-areas A of the tracks T in the section identification region F are recorded the same program number data as the one recorded in the corresponding data region E0. Further, an index data "00" or "AA" is recorded in the sub-areas A of the tracks T in the section identification region F. The index data "00" is recorded in the sub-areas A of the tracks from the first one up to the one of a specified number in the section identification region F, whereas the index data "AA" is recorded in the sub-areas A of the subsequent tracks therein. The index data is used to set the head at the leading end of the data region E0. For example, the section identification region F including the program number data and the index data "00" and "AA" is detected, and the head 32 is caused to stop rotating in the vicinity of a boundary line between the index data "00"s and "AA"s in the section identification region F such that the head 32 is relatively moved to the leading end of the corresponding data region E0.

The length of the section identification region F and that of the data region E0 are controlled by measuring the recording period (P.time in FIG. 6).

Figure 7:
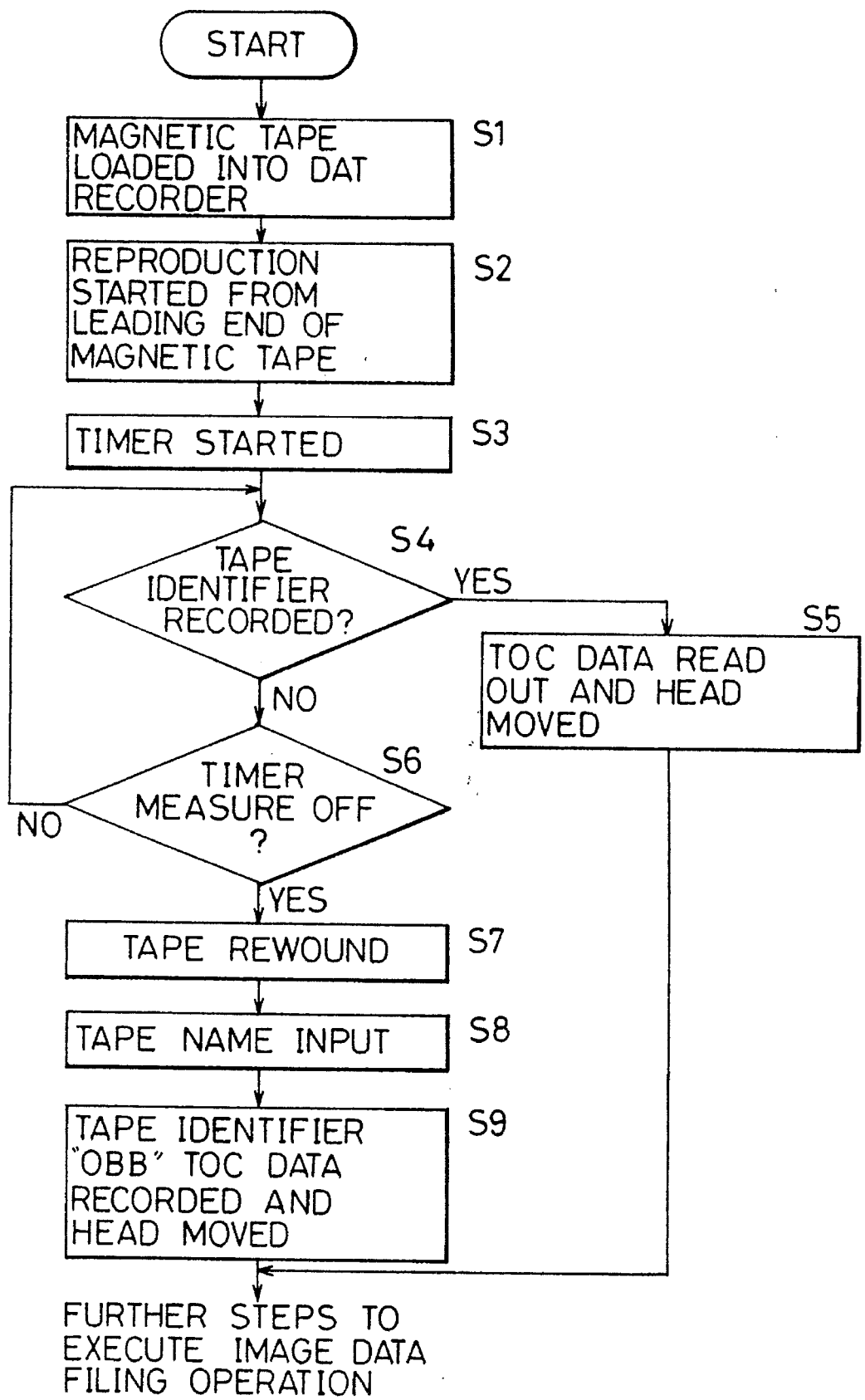
FIG. 7 is a flow chart showing an operation of loading the magnetic tape into the magnetic tape recording device.

There will be described an operation of loading the magnetic tape into the magnetic tape recording device 1 next with reference to a flow chart shown in FIG. 7.

First of all, when the magnetic tape 21 is loaded into the DAT recorder 3 in Step S1, reproduction of the data is started from the leading end of the magnetic tape 21 in Step S2 and a timer is started in Step S3. This timer is used to measure a reproducing period required to reproduce the data recorded in the read-in region C, e.g. about 17 seconds.

In Step S4, it is discriminated whether the tape identifier "0BB" is recorded in the read-in region C based on the reproduction result. If the tape identifier is detected (YES in Step S4), the loaded magnetic tape 21 is determined to be a used one and this routine proceeds to Step S5. In Step S5, the TOC data recorded in the TOC region D following the read-in region C on the magnetic tape 21 is read out to the RAM 7 through the TOC administering unit 8 of the operation control unit 5, and the head 32 is relatively moved to the data region E0 of a specified address. Then, this routine proceeds to further steps (not shown) so as to execute the image data filing operation.

On the other hand, if the tape identifier is not detected (NO in Step S4), it is discriminated whether the timer has measured the reproducing period yet in Step S6. Upon lapse of the reproducing period (YES in Step S6), the loaded magnetic tape 21 is determined to be a new one, and is rewound to a leading end position thereof so as to record the tape identifier and the TOC data thereon in Step S7. Then, the name of the tape is input in Step S8. Thereafter, the following operations are executed in Step S9: 1) The tape identifier "0BB" and the initial TOC data (initial data concerning the tape attribute including the name of the tape, a conversion table, etc.) are input to the DAT recorder 3 respectively from the identifier generator 53 and the administrative data generator 54; 2) The tape identifier "0BB" and the TOC data are recorded in the read-in region C and the TOC region D of the magnetic tape 21 respectively; and 3) The head 32 is relatively moved to the data region E0 of the specified address upon completion of recording of the above data. Then, this routine proceeds to further steps so as to execute the image data filing operation.

As described above, in the magnetic recording device 1, the tape identifier "0BB" used to discriminate whether the loaded magnetic tape 21 is new or used is recorded in the read-in region C of the magnetic tape 21. Accordingly, the magnetic tape 21 can be determined to be new or used readily and rapidly just by discriminating the content recorded in the read-in region C.

Further, when the magnetic tape 21 is determined to be new based on the content recorded in the read-in region C, the tape 21 is immediately rewound to record the TOC data, and to relatively move the head 32 to the specified data region E0. Thus, the magnetic tape recording device 1 is allowed to proceed to the filing operation smoothly in a short time even in the case where the new magnetic tape 21 is loaded, thereby enhancing the operability thereof.

There will be described an operation of recording data on the magnetic tape 21 carried out in the magnetic tape recording device 1 next with reference to FIGS. 8 to 10.

Figures 8, 9:
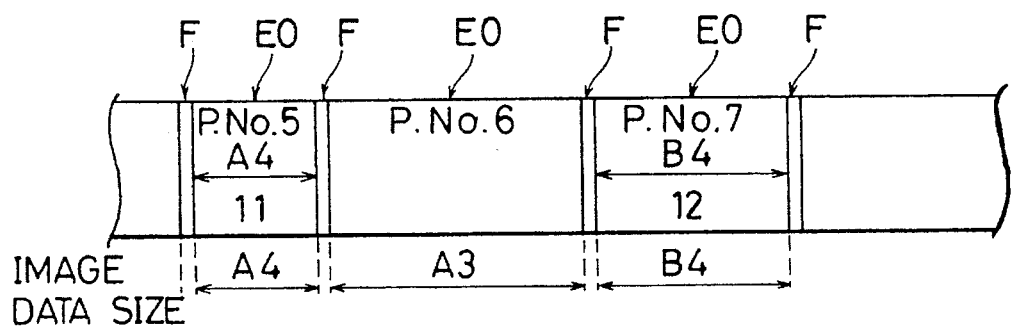
FIG. 8 is a chart showing an example of TOC data concerning an image data which are recorded in the TOC region in the first embodiment.
FIG. 9 is a schematic diagram showing an example of image data recorded in a data region group of the magnetic tape in the first embodiment.

FIG. 8 is a chart showing an example of the TOC data concerning the image data which are recorded in the TOC region D. The TOC data concerning the image data recorded in the respective data regions E0 includes the program data number, (P. No.), file number (FILE No.), page number (PAGE No.), unused flag, erase flag, unusable flag, image size data, etc. The P. No. is described above. The FILE No. is a number indicative of a bunch of recorded image data. The PAGE No. is a number given to each image data constituting the file. In the example shown in FIG. 8, the image data of a file No. F3 are recorded in the data regions E0 of P. No. 3 to 5. The file No. F3 includes three image data of A4 size, which are recorded sequentially in the data regions E0 of P. No. 3 to 5 according to the page number thereof.

The unused flag is indicative of whether the image data is recorded in the data region E0. The unused flag indicates that no image data is recorded in the data region E0 when being set to "1." In FIG. 8, the data regions E0 of P. No. 9 and 10 are in unused states. The erase flag is indicative of whether the image data is renewably recordable in the data region E0. The erase flag indicates that the image data in the data region E0 is renewable when being set to "1." In FIG. 8, the image data is renewable in the data region E0 of P. No. 6. It will be understood that, when the erase flag is set to "1" in the TOC data, the image data in the corresponding data region E0 is not erased simultaneously, but is deleted when a next image data is recorded in that data region E0. The unusable flag is indicative that the data region E0 is in an unrecordable state due to deterioration of the tape or the like. The unusable flag indicates that the data region E0 is in the unrecordable state when being set to "1." In FIG. 8, the data region E0 of P. No. 1 is in the unrecordable state.

The image size data is representative of the size of the image data recorded in the data region E0. The image size data is represented by the standard sheet size. For example, A3 indicates that the image data recorded in the data region E0 is equivalent in size to the image data obtained when an image formed on a document of A3 size is read by the scanner 6.

FIG. 9 is a schematic diagram showing an example of the image data recorded in the data region group E of the magnetic tape 21. This example corresponds to the contents recorded in the data regions E0 of P. No. 5 to 7 shown in FIG. 8.

In this figure, indicated at I1, I2 are image data recorded in the data regions E0 of P. No. 5 and 7 respectively. The image data I1, I2 are A4, and B4 in size. No image data is indicated in the data region E0 of P. No. 6. This is because the erase flag corresponding to this data region is set to "1" and the image data is erasable in this data region. However, the image data is in fact recorded in this data region until a next image data is renewably recorded therein.

In this embodiment, since each image data forms the data region E0, the size (length) of the respective data regions E0 corresponds with that of the image data recorded therein.

There will be described an operation of recording the image data carried out in this embodiment with reference to a flow chart shown in FIG. 10.

Upon start of the recording operation for the image data, the feed of the magnetic tape 21 is started by the DAT control unit 14 and the image data is transferred from the page memory 11 to the head control unit 15 in Step S11. Then, in Step S12, the EOD signal representative of the end of the image data is detected. Upon detection of the EOD signal (YES in Step S12), it is started to record a section identifier representative of the leading end of a next image data and to measure a recording period in Step S13. In Step S14, it is discriminated whether a predetermined recording period has elapsed. Upon lapse of the predetermined recording period (YES in Step S14), the recording of the section identifier is completed. In other words, the section identifier representative of the head of the next data region is recorded on the magnetic tape 21 each time the recording of one image data thereon is completed.

A second embodiment of the invention will be described next with reference to FIGS. 11 to 13.

In this embodiment, the length of each data region E0 is fixed at a specified value. Specifically, the length of each data region E0 is set to that of the data region occupied by a largest recordable image data. For example, in the case where the size of the largest recordable image data is A3 size, the data region E0 is made to have a length as much as to record the A3 size image data therein. Hereinafter, such a length is referred to as an A3 region length.

The data regions E0 are formed based on a record region having a preset unit length (hereinafter referred to as a record region unit length). Accordingly, all the data regions E0 are equally sized in this embodiment.

Figures 10, 11:
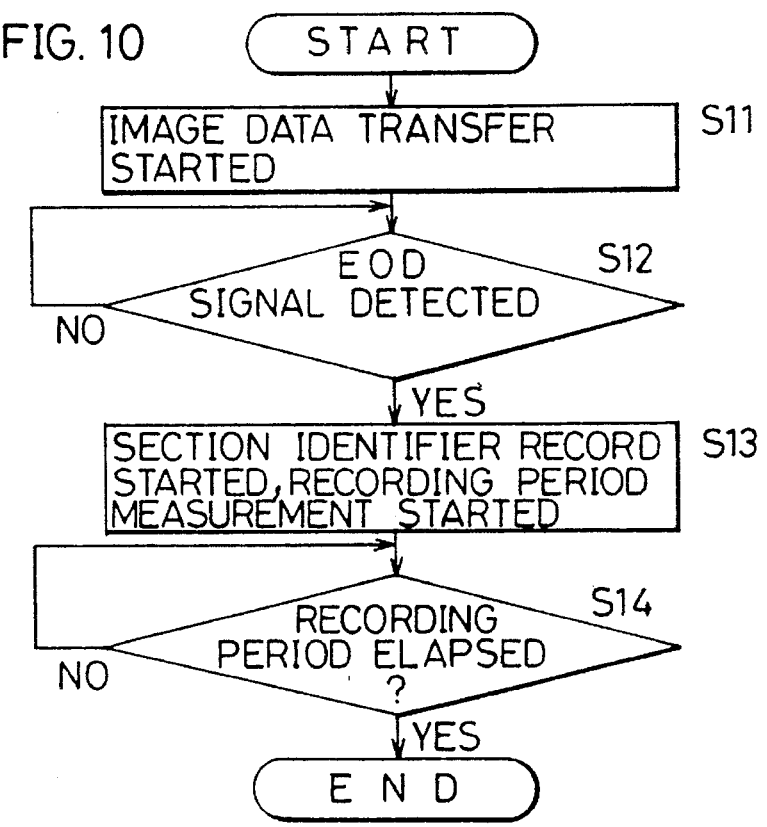
FIG. 10 is a flow chart showing an operation of recording the image data in the first embodiment.
FIG. 11 is a chart showing an example of TOC data concerning an image data which are recorded in the TOC region in a second embodiment.

FIG. 11 is a chart showing an example of TOC data concerning the image data which are recorded in a TOC region. In this chart, the format size data indicates that the size of the data regions E0 are fixed to A3 size. In the first embodiment, the format size data is not included in the TOC data because the data region E0 is formed by each image data recorded therein, and accordingly the length of the data region E0 is variable.

Figure 12:
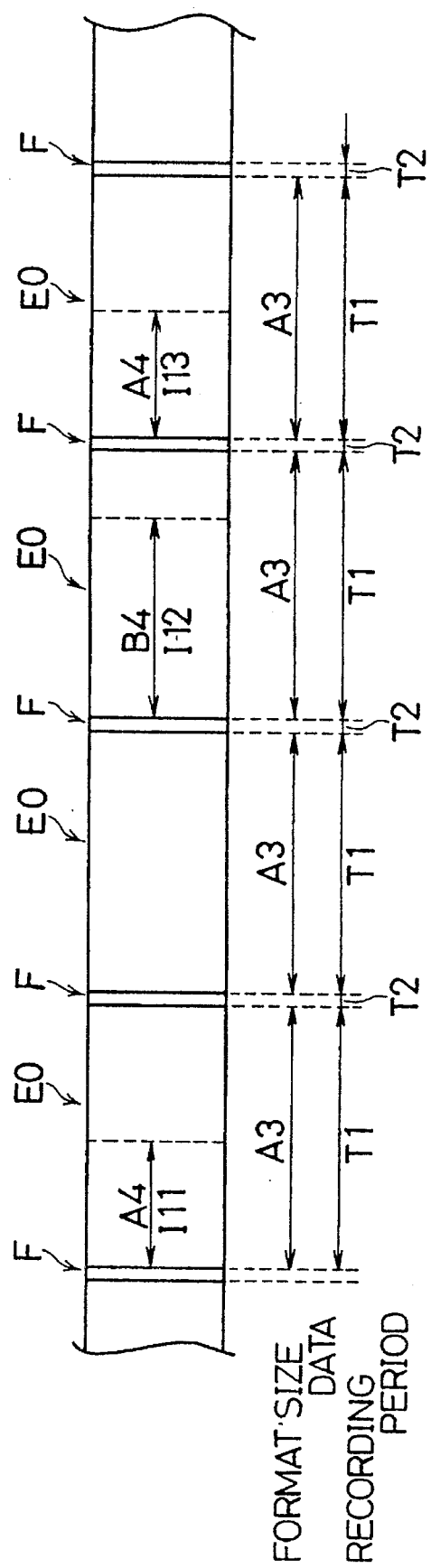
FIG. 12 is a schematic diagram showing an example of image data recorded in the data region group of the magnetic tape in the second embodiment.
Figure 13:
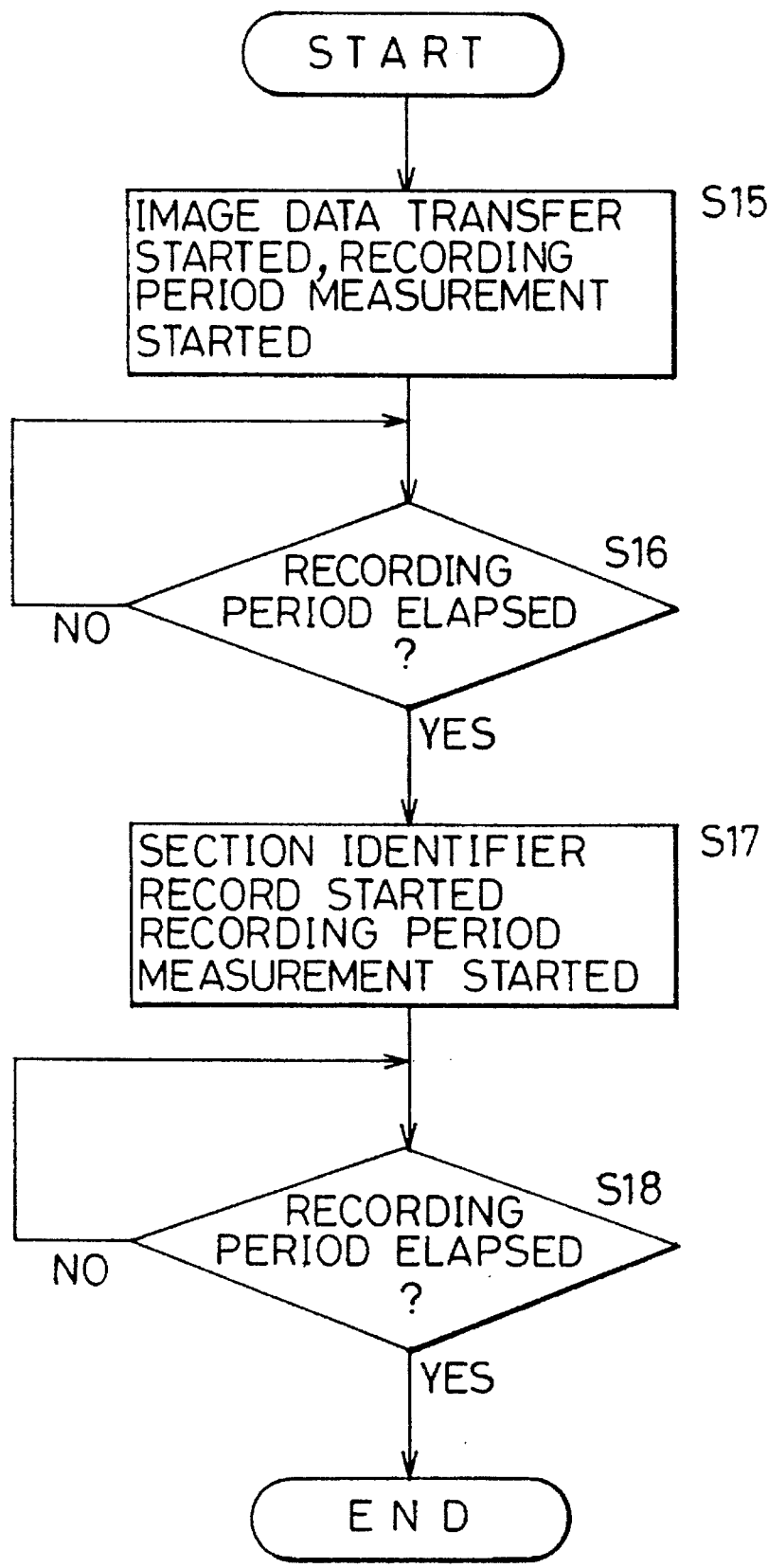
FIG. 13 is a flow chart showing an operation of recording the image data in the second embodiment.

FIG. 12 is a schematic diagram showing an example of image data recorded in the data regions E0 of the magnetic tape 21, and the data shown in FIG. 12 correspond to the contents recorded in the data regions E0 of P. Nos. 5 to 8 in FIG. 11.

As shown in this FIG., the respective data regions E0 of P. Nos. 5 to 8 have the A3 region length each, and an A4 size image data I11, a B4 size image data I12, and an A4 size image data I13 are respectively recorded in the data regions E0 of P. Nos. 5, 7, and 8. The data region E0 of P. No. 6 is a data erasable region, and an erasable image data is recorded therein although not shown in this figure Indicated at T1, T2 are predetermined recording periods required to record the A3 size image data and the section identifier respectively. In this embodiment, since the length of section identification regions F and that of the data regions E0 are fixed, the recording of the respective data is controlled according to the recording periods T1, T2 as will be described later.

There will be described an operation of recording the image data carried out in the second embodiment next with reference to a flow chart shown in FIG. 13.

Upon start of the recording operation for the image data, the feed of the magnetic tape 21 is started by the DAT control unit 14; the transfer of the image data (e.g. I11) is started; and measurement of the recording period T1 is started as timed with the start of the transfer of the image data in Step S15. Upon lapse of the predetermined recording period T1 (YES in Step S16), it is determined that the operation of recording the image data in the data region E0 is completed. Thereupon, it is started to record the section identifier representative of the head of a next image data in the section identification region F, and to measure the recording period T2 at the same time in Step S17. Upon lapse of the recording period T2 (YES in Step S18), the recording of the section identifier is completed. In other words, on the magnetic tape 21, the section identifier representative of the head of the image data is recorded at intervals of a specified record region unit length and one image data following the section identifier is recorded within the record region determined by the fixed record region unit length.

In this embodiment, since the size of the data region E0 is set equal to that of the largest recordable image data, e.g. A3 size, all the image data can be each recorded in one corresponding data region E0 without being recorded separately in a plurality of data regions E0. This facilitates the renewing, editing, and like operations for the image data.

A third embodiment of the invention will be described next with reference to FIGS. 14 to 16.

In this embodiment, a predetermined reference length is set as a record region unit length, and the length of the data region E0 is represented based on the reference length. Specifically, the reference length, i.e. the record region unit length, is set to the length of the reference record region occupied by a smallest recordable image data. For example, in the case where the size of the smallest recordable image data is A5 size, the record region unit length of the data region E0 is set a length of record region occupied by the A5 size image data. Hereinafter, such a length is referred to as an A5 region length.

In the second embodiment, the respective data regions E0 are all made to have the length equal to the record region unit length. This embodiment differs from the second embodiment in that the length of the respective data regions E0 varies depending upon the size of the image data recorded therein.

Figure 14:
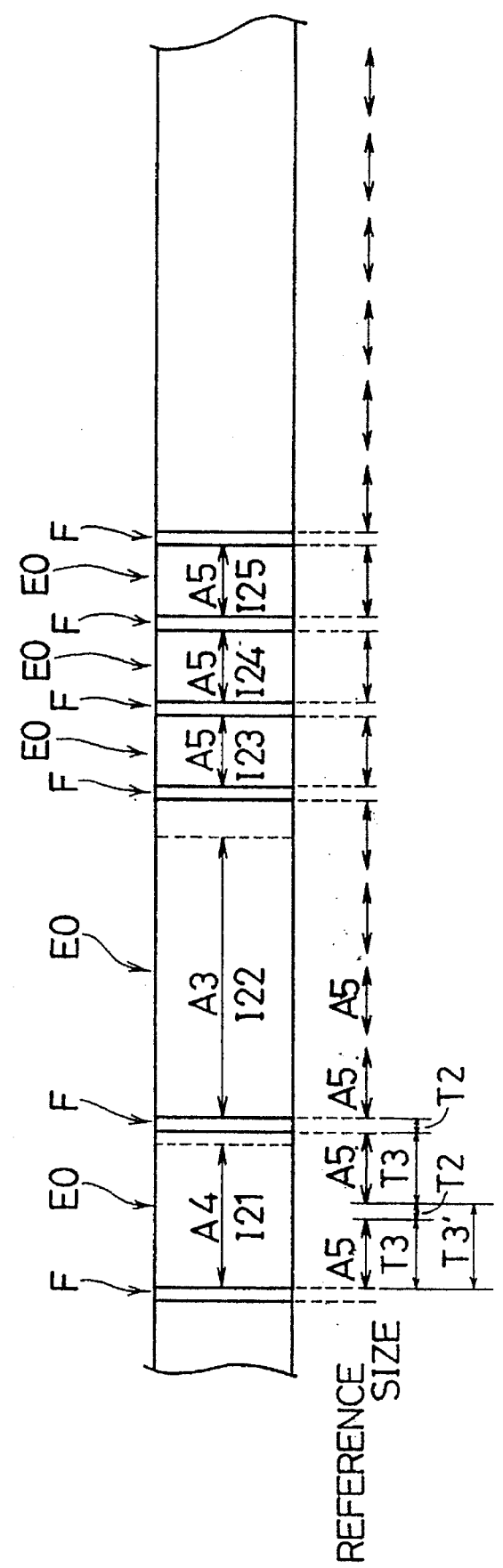
FIG. 14 is a schematic diagram showing an example of image data recorded in the data region group of the magnetic tape in third and fourth embodiments.

FIG. 14 is a schematic diagram showing an example of image data recorded in the data regions E0 whose length is equal to or a multiple of the reference A5 region length.

In this figure, indicated at I21 to I25 are image data, the image data I21 being A4 size, the image data I22 being A3 size, and the image data I23 to I25 being A5 size. Since the image data I23 to I25 are same in size with the reference record region, a section identifier representative of the head of a next data region E0 is recorded after each of the image data I23 to I25 is recorded. Accordingly, the length of these data regions E0 is the A5 region length.

On the other hand, since the size of the image data I21 is twice as large as that of the reference record region, the section identifier representative of the head of the next data region E0, namely the image data I22, is recorded after the image data I21 is recorded and an empty region as large as one section identification region is formed following the data region E0 for the image data I21. Accordingly, the length of the data region E0 for the image data I21 is twice the record region unit length plus the length of the section identification region. Since the size of the image data I22 is four times as large as that of the reference record region, the section identifier representative of the head of the image data I23 is recorded after the image data I22 is recorded and an empty region three times as large as one section identification region is formed following the data region E0 for the image data I22. Accordingly, the length of the data region E0 for the image data I22 is four times the record region unit length plus three times the length of the section identification region.

Indicated at T3 is a recording period necessary to record the image data of the reference size (A5 size in FIG. 14). The recording period T3 is set in advance. Further, indicated at T3' is a sum of the recording period T3 and the recording period T2 required to record the section identifier. The period T3' is a recording period serving as a reference (hereinafter referred to as a reference recording period) to control the recording of the image data as will be described later.

Figure 15:
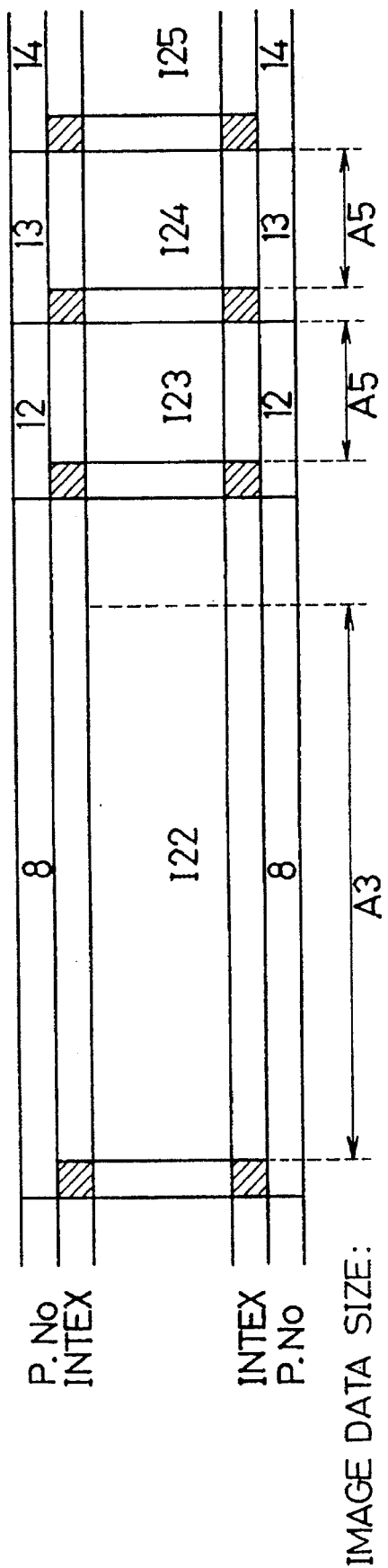
FIG. 15 is a diagram showing an example of program number data (P. No.) which are recorded on the respective data regions of the magnetic tape in the third embodiment.
Figure 16:
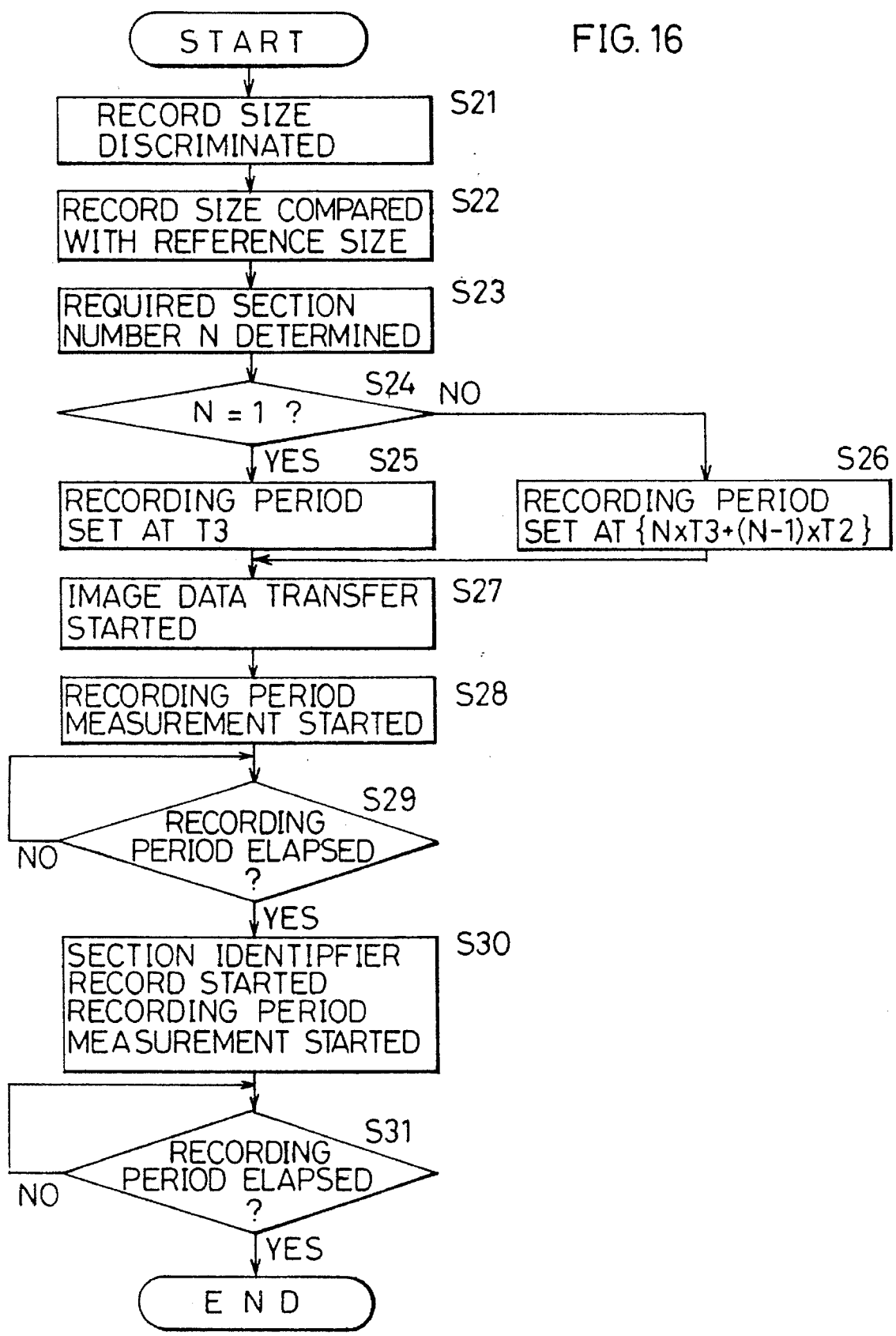
FIG. 16 is a flow chart showing an operation of recording the image data in the third embodiment.

FIG. 15 is a diagram showing an example of program number data (P. No.) which are recorded on the respective data regions E0 for the image data I22 to I25 shown in FIG. 14.

As shown in this figure, the P. Nos. 8, and 12 to 14 are recorded in the data regions E0 for the image data I22 to I25, but the P. Nos. 9 to 11 are not used in this example. This is done in consideration of a possible event that the data region E0 for the image data I22 is divided into two or more data regions in filing the image data or the like. In such an event, the P. Nos. 9 to 11 are assigned to the divided data regions.

There will be described an operation of recording the image data carried out in the third embodiment next with reference to a flow chart shown in FIG. 16.

First of all, the size of the image data to be recorded (herein after referred to as the record size) is discriminated in Step S21, and the record size is compared with the reference size in Step S22. Thereafter, the number N of sections (section number, N≧1) required to record the image data is determined in Step S23.

Subsequently, it is discriminated whether the section number N is equal to 1 in Step S24. If N=1 (YES in Step S24), the recording period is set at the reference recording period T3' (see FIG. 14) in Step S25. On the other hand, if N>1 (NO in Step S24), the recording period is set at {N×T3+(N−1)×T2} in Step S26.

In Step S27, the feed of the magnetic tape 21 is started by the DAT control unit 14 and the transfer of the image data (e.g. I21) is started in Step S27. As timed with the start of the image data transfer, measurement of the recording period set in Step S25 or S26 is started in Step S28.

Upon lapse of the set recording period (YES in Step 29), it is started to record the section identifier representative of the head of the next image data and also to measure the recording period T2 in Step S30. Upon lapse of the recording period T2 (YES in Step S31), the recording of the section identifier is completed.

As described above, when the image data to be recorded is of the reference size, the section identifier representative of the head of the next data region E0 is recorded at intervals of the record region unit length. On the other hand, when the size of the image data to be recorded is larger than the reference size, the image data is continuously and entirely recorded without being interrupted to record the section identifier for the next image data. The section identifier for the next image data is recorded following the reference record region containing an end point of the large size image data after the recording of the large size image data is completed.

In this embodiment, the data region E0 for the image data includes one or more the reference record regions. Accordingly, the data region larger than the reference record region is dividable into smaller data region, thereby facilitating the editing and revising operations for the image data, and enabling the data region group E to be efficiently utilized.

A fourth embodiment of the invention will be described with reference to FIGS. 14, and 17 to 19.

This embodiment is similar to the third embodiment in that the length of the data region E0 is represented based on the record region unit length serving as a reference length. This embodiment is different from the third embodiment in that the P. Nos. are incrementally assigned to the data regions E0 at the intervals of the record region unit length in the case where the length of the data region E0 is a multiple of the record region unit length.

FIG. 17 is a chart showing an example of TOC data concerning the image data which are recorded in a TOC region. As shown in this chart, A5 size is set as a reference size, and each data region E0 includes one or more A5 size reference record region whose length serves as a reference length.

In this chart, contents of the image data recorded in the data regions E0 of P. Nos. 8 to 14 are same as those shown in the third embodiment, and correspond with the image data shown in FIG. 15. Though being not used in the third embodiment, the P. Nos. 9 to 11 are used as TOC data in the example shown in FIG. 17 in place of a portion of the P. No. 8 of the third embodiment.

Figure 18:
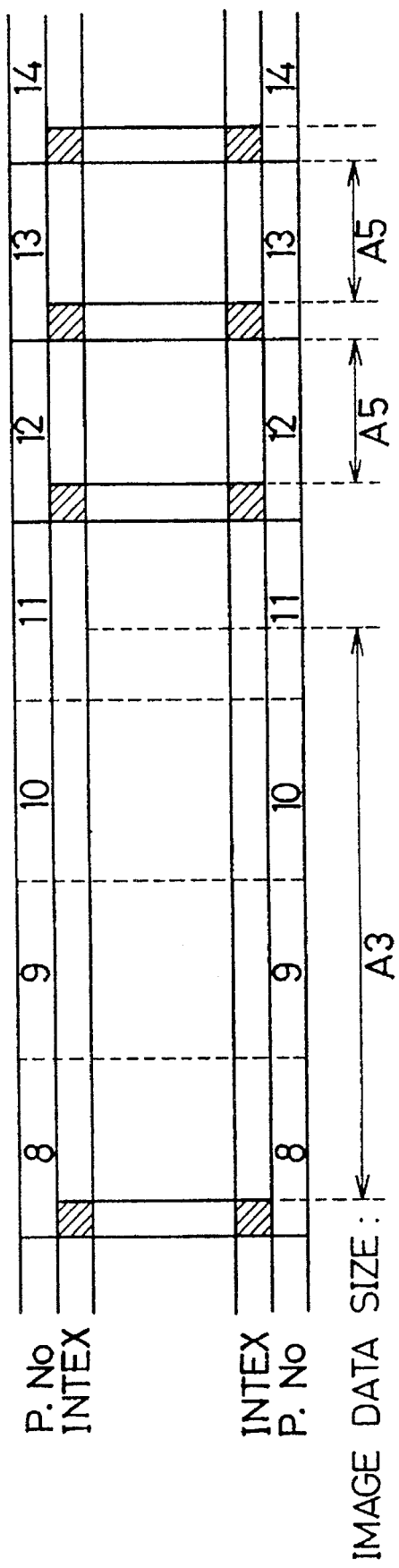
FIG. 18 is a diagram showing an example of program number data (P. No.) which are recorded on the respective data regions of the magnetic tape in the fourth embodiment.

FIG. 18 is a diagram, corresponding to FIG. 15, showing an example of program number data (P. No.) which are recorded in the data regions E0 in which the image data I21 to I25 are recorded.

As shown in this figure, the P. Nos. 8 to 11 are recorded in the data region E0 for the image data I22 at the intervals of the record region unit length.

Figure 19:
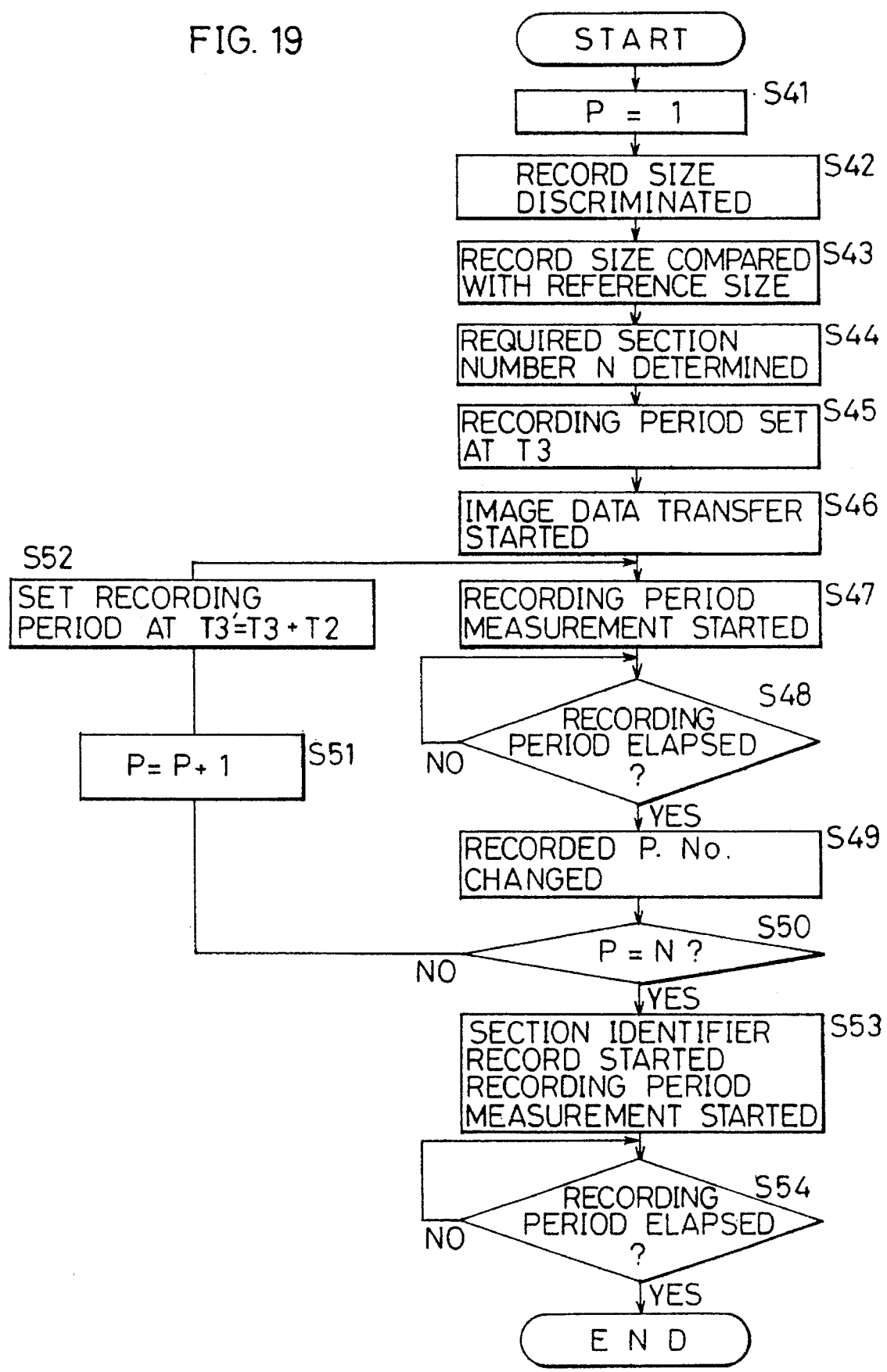
FIG. 19 is a flow chart showing an operation of recording the image data in the fourth embodiment.

There will be described an operation of recording the image data carried out in the fourth embodiment next with reference to a flow chart shown in FIG. 19.

First of all, a counter P is set to "1" in Step S41. Subsequently, the size of the image data (record size) is discriminated in Step S42; the discriminated record size is compared with the reference size in Step S43; and the section number N (≧1) required to record the image data is determined in Step S44. In Step S45, the recording period is set at the reference size recording period T3 (see FIG. 14) in Step S45, and the feed of the magnetic tape 21 is started by the DAT control unit 14 and the transfer of the image is started in Step S46. As timed with the start of the transfer of the image data, measurement of the recording period is started in Step S47. Upon lapse of the set recording period T3 (YES in Step S48), the P. No. recorded in the data region E0 is changed in Step S49.

Subsequently, it is discriminated whether a value p set in the counter P is equal to the section number N in Step S50. If p=N (YES in Step S50), it is started to record the section identifier representative of the head of the next image data and also to measure the recording period T2 in Step S53. Upon lapse of the recording period T2 (YES in Step S54), the recording of the section identifier is completed.

On the other hand, if p<N (NO in Step S50), the value in the counter P is incremented by one in Step S51. Thereafter, the recording period is set at (T3+T2) in Step S52, and this routine returns to Step S47. An operation loop of Steps S47 to S50 to S47 is repeated until the value p of the counter P becomes equal to the section number N while changing the P. No. upon each lapse of the set recording period. When the value p of the counter P becomes equal to the section number N (YES in Step S50), it is started to record the section identifier representative of the head of the next image data and also to measure the recording period T2 in Step S53. Upon lapse of the recording period T2 (YES in Step S54), the recording of the section identifier is completed.

As described above, when the image data to be recorded is of the reference size, the section identifier representative of the head of the next data region E0 is recorded at intervals of the record region unit length. On the other hand, when the size of the image data to be recorded is larger than the reference size, the image data is continuously and entirely recorded while incrementing the P. No. assigned to the data region E0 by one at the intervals of the record region unit length. The section identifier for the next image data is recorded following the reference record region containing an end point of the large size image data after the recording of the large size image data is completed.

This embodiment demonstrates the same effect as the third embodiment. Particularly, in the data region group E, the P. No. is incrementally assigned to each record region including the reference record region and the corresponding section identification region F. Accordingly, the P. No. in the TOC data corresponds one to one with the actual P. No. in the magnetic tape, thereby improving reliability in data administration.

Although the present invention has been fully described by way of example with reference to the accompanying drawings it is to be understood that various changes and modifications will be apparent to those skilled in the art. Therefore, unless otherwise such changes and modifications depart from the scope of the present invention, they should be construed as being included therein.

What is claimed is:

1. A magnetic tape recording device for recording a plurality of data on a magnetic tape and a first leading portion, a second leading portion following the first leading portion, and a main portion following the second leading portion, the device comprising:

tape identifier recording means for recording a tape identifier on the first leading portion of the magnetic tape, the tape identifier being adapted for identifying whether the magnetic tape is used or new;

administrative data recording means for recording administrative data on the second leading portion of the magnetic tape, the administrative data being adapted for administrating the recording position of data on the magnetic tape;

data recording means for recording subject data on the main portion;

determinator means for determining based on the tape identifier whether the magnetic tape is used or new;

administrative data reader means for reading administrative data recorded on the second leading portion;

section identifier recording means for recording a section identifier representative of a head of a subject data region for receiving subject data to be recorded thereon and to be used for data administration; and control means, responsive to the determinator means for controlling the data recording means, the tape identifier recording means, the administrative data recording means, the administrative data reader means, and the section identifier recording means, the control means being for:

recording the tape identifier on the first leading portion to indicate that the magnetic is used, the administrative data on the second leading portion, the subject data on the main portion of the magnetic tape, and a section identifier for a next subject data region immediately following a defined data on the main portion when the determinator determines that the magnetic tape is new; and reading the administrative data from the second leading portion when the determinator determines that the magnetic tape is used.

2. A magnetic tape recording device as defined in claim 1 wherein the size of each subject data region is set so as to correspond with that of the subject data to be recorded therein.

* * * * *